Patented Apr. 10, 1945

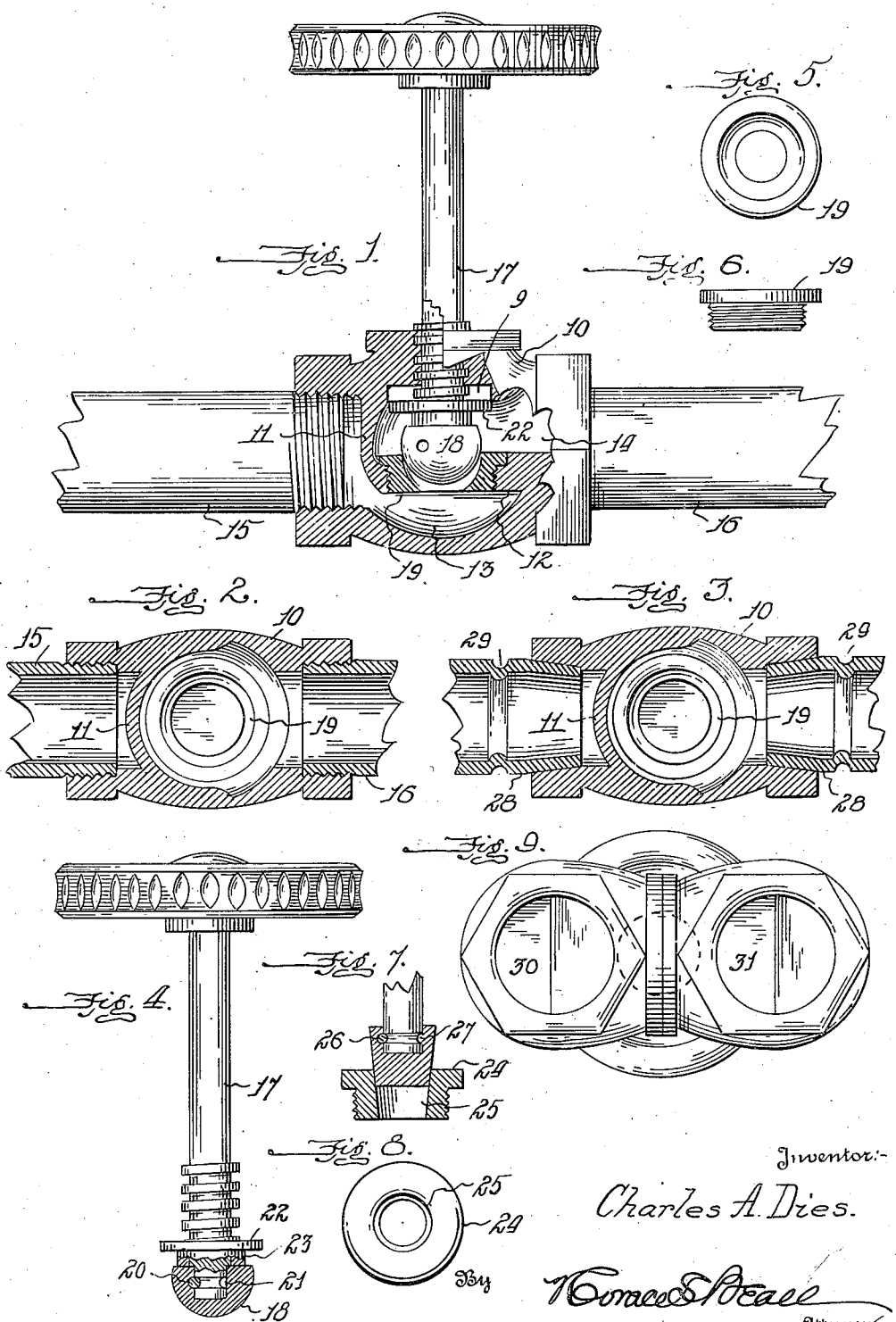

2,373,552

UNITED STATES PATENT OFFICE 2,373,552

GLOBE VALVE

Charles A. Dies, Chicago, Ill.

Application May 10, 1943, Serial No. 486,350

1 Claim. (Cl. 251—32)

This invention relates to valves, and more especially to globe valves employed for cutting off the flow of water or other fluid in a pipe line in which the valve is interposed.

The main object of my invention is to provide a valve of this kind—including a plug adapted to cooperate with an opening in the valve seat approximating the shape of the plug—with means associated with the valve stem whereby to seal the valve stem and casing engaging portions in the open position of the valve and thus prevent leakage.

With this principal object in view my invention therefore consists in the particular construction hereinafter fully described and more specifically set forth in the appended claim.

In the drawing:

Fig. 1 is a side elevation of a globe valve constructed in accordance with my invention, part of the casing being broken away to show the plug and seat.

Fig. 2 is a horizontal sectional view through the valve and pipes connected thereto by threaded engagement.

Fig. 3 is a similar view illustrating another form of pipe connection with the valve.

Fig. 4 is a detail view of the valve stem and plug, the latter being in section to show the manner of connecting the same to the lower end of the stem.

Figs. 5 and 6 are detail views of the valve seat.

Figs. 7 and 8 are detail views illustrating a modified form of valve plug and seat, and Fig. 9 is a modification in respect to the valve casing.

My invention is carried out in association with a valve casing 10 of a conventional type; that is, said casing in addition to the usual valve-stem working in the upper portion thereof has a semicircular partition 11 and a horizontal wall 12 which divide the casing into an inlet chamber 13 and outlet chamber 14 communicating with pipes 15 and 16 threaded into the opposite ends of the casing or otherwise connected thereto—the horizontal wall having a removable valve-seat 19 in threaded engagement with an opening through said wall to cooperate with a valve plug for closing communication between the inlet and outlet chambers. Furthermore, in order to provide an effective back seating valve the upper wall of the casing—through which the valve stem passes—is provided at the inner side thereof with a recess 9 surrounding the stem to receive specific means, hereinafter described, for sealing the valve in the open position thereof.

According to my invention—in its preferred form—the valve plug, 18, is in the form of a segmental ball, and the opening through the valve-seat though somewhat of the same shape as the ball is narrower at its upper end, so that said ball shaped plug will fit in the upper portion of the opening in the seat in the closed position of the valve. This construction or shape of the valve plug and seat is advantageous for the reason that in the continued operation of the valve the plug will gradually wear its way into the seat and at all times provide a close fit for effectively cutting off the flow of fluid or liquid through the valve seat. Furthermore, in order to increase the effectiveness of the particular form of valve plug and cooperating seat the plug is connected to the lower end of the valve-stem in a particular manner to prevent leakage when the valve is open.

By reference to Fig. 4 it will be noted that in connecting the ball-shaped valve plug to the valve stem the latter is reduced at its lower end and the plug is provided with a recess in which the reduced end fits—the parts being connected by a pin 20 extending through a hole in the plug to engage a circumferential recess 21 in the reduced end of the stem by which the plug is permitted to turn on the stem. To provide for an easy turning movement of the plug and also to prevent leakage between the threaded portion of the stem and casing there is a fiber washer 22 at the lower end of the threaded portion of the valve stem and between this washer and the plug I interpose a metal washer, 23, of slightly less diameter than the fiber washer, which latter corresponds in diameter with the aforementioned recess 9. This arrangement assures a sealing fit between the valve-stem and casing, as the fiber washer sealingly slides within the recess for intimate engagement therewith under the influence of the metal washer bearing thereagainst, thus preventing leakage in the open position of the valve.

As a modification in the shape of the plug and opening in the valve seat I contemplate forming the plug as illustrated in Figs. 7 and 8, in which the plug, 24, is tapered and the opening, 25, in the valve seat is also tapered—the taper of the opening in the valve seat being slightly narrower so that the plug will initially engage in the upper end thereof for the purpose stated in reference to the ball-shaped plug and cooperating valve seat. In this instance the plug is likewise connected to the valve stem by pin, 26, and groove, 27, in the plug and stem respectively.

The ends of the valve casing may be provided with the usual standard internal threads to receive pipes 15 and 16 (Fig. 2), but I prefer to employ the taper fit coupling (Fig. 3) following the construction shown in my companion application for patent filed March 27, 1943, Serial No. 480,811 in which the pipes, 28, 29, are each provided with a circumferential groove 29.

In Fig. 9 I have shown the application of my invention to a valve of that type in which the pipes—between which the valve is interposed—instead of being connected to the opposite ends of the casing are connected to one side or bottom opposite the valve stem, and in this instance the inlet chamber is designated by the numeral 30 and the outlet by 31. The location of the valve seat and plug are indicated by the dotted lines. Consequently my invention contemplates its application to different types of valves to effect a close fit between the valve plug and its seat, and the sealing of the valve—to prevent leakage—in the open position thereof.

I claim:

In combination with a globe valve including a casing having chambers separated by a partition wall with a seat therein for a valve-plug at the lower end of a valve-stem threaded through the upper wall of the casing, of means for sealing the stem and casing engaging portions in the open position of the valve comprising a recess at the inner side of the upper wall of the casing around the valve-stem, a metal washer on the valve-stem above the plug, and a fiber washer on the stem immediately above the metal washer and of slightly greater diameter than the latter to sealingly slide within the aforementioned recess in the casing and prevent leakage around the valve-stem in the open position of the valve.

CHARLES A. DIES.